Dec. 5, 1967        F. N. KOLBERG        3,355,772

MOULD FOR FORMING RUBBER ROLLERS

Filed Oct. 21, 1965

INVENTOR.
Frithjof N. Kolberg
BY
Sam J. Slotsky
ATTORNEY

United States Patent Office 3,355,772
Patented Dec. 5, 1967

3,355,772
MOULD FOR FOAMING RUBBER ROLLERS
Frithjof N. Kolberg, 2613 W. 29th St.,
Sioux Falls, S. Dak. 57105
Filed Oct. 21, 1965, Ser. No. 499,215
1 Claim. (Cl. 18—36)

My invention relates to a mould for forming rubber rollers.

An object of my invention is to provide a special type of mould which will effectively form a rubber roller having a plurality of spaced ribs formed on said roller, and to further provide a homogeneous roller form which will effectively adhere to a central metal hollow core.

A further object of my invention is to provide a mould of this type which is readily assembled or disassembled.

Figure 1:
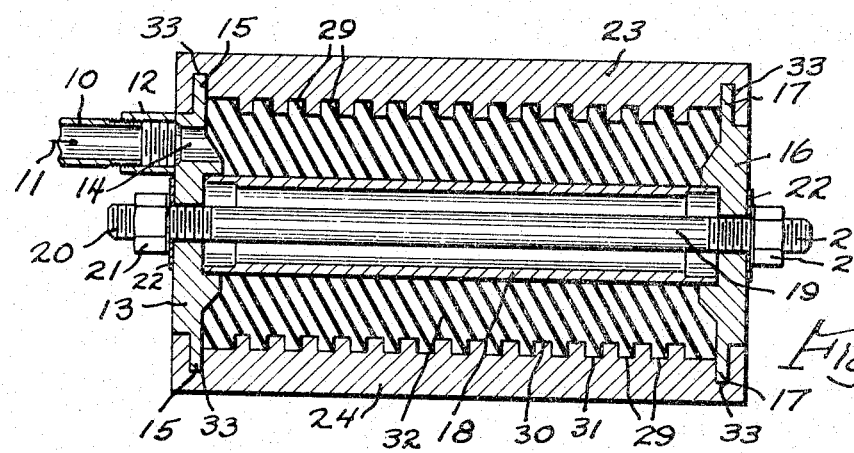
Figure 2:
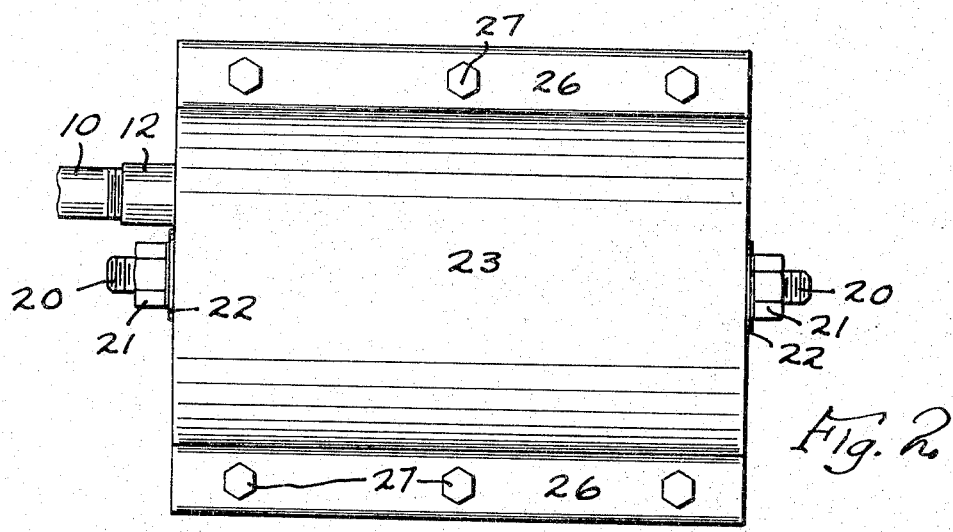
Figure 3:
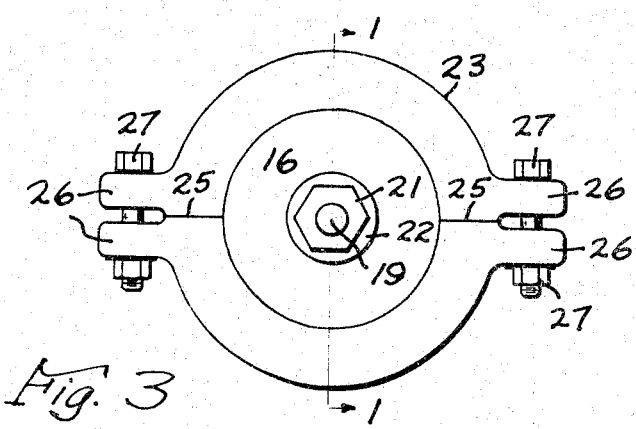

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

FIGURE 1 is a sectional view of the mould taken generally along the lines 1—1 of FIGURE 3, FIGURE 2 is a plan view of FIGURE 1, and FIGURE 3 is an end view of the mould.

My invention contemplates the provision of an easily assembled and disassembled mould in which rubber rollers of the type for conveyor belts or other types can be effectively made, and wherein the ribbing and grooves on the mould can be made in a more or less square cross-section form, the mould including other advantages such as complete adherence to the central core, etc.

In describing my invention I have used the character 10 to designate a tube communicating to any suitable type of extrusion apparatus through which semi-cured rubber is forced in the direction of the arrow 11 into the mould itself, such extrusion apparatus usually being in the form of a piston forced arrangement which forces the rubber under pressure into the mould, the character 12 indicating a coupling unit attached to a plate 13 having an opening 14, the plate 13 including the outer peripheral flange portion 15.

The character 16 indicates a further end plate having a similar peripheral flange 17. The character 18 designates a tubular core member which usually will receive the shaft upon which the resultant roller will be mounted, and the character 19 designates a lengthened bolt having the threaded ends 20 which ends are threadably engaged by the nuts 21, the character 22 indicating washers, this latter arrangement serving to bolt the mould parts together.

The character 23 indicates an upper semi-circular mould section, the character 24 indicating a lower section, the sections 23 and 24 being engaged at 25 when bolted together, the character 26 indicating flanges through which pass the various spaced bolts and nuts 27 and 28 for tightly securing the sections 23 and 24 together during the moulding operation.

The character 29 designates a series of longitudinally spaced grooves in the sections 23 and 24, it being noted that these grooves are of an approximately square configuration in cross section so that when the rubber is moulded there will be provided the inner grooves 30 and the outer surfaces 31.

The injected rubber is indicated generally by the character 32. Before the moulding operation is performed, the sections 23 and 24 are placed so that the arcuate grooves 33 therein will be received over the flange portions 15 and 17, the plates 13 and 16 being held by the bolt 19, and during the extrusion process the rubber will be forced under pressure through the opening 14 and the pressure will be applied until the mould is filled, and after the necessary interval the bolts and nuts 27 and 28 are removed, the sections 23 and 24 are split apart, and the nuts 21 are removed as well as the plates 13 and 16, the excess rubber in the opening 14, etc. is cut away, and the roller itself is removed and ready for operation. The shaft upon which the roller is mounted is placed within the member 18, the further end portions 34 providing means for the reception of bearings.

Usually rubber rollers of this type heretofore were made up of a series of rubber discs pressed together, and would not adhere strongly to the central shaft portion, and I have found in the present type of mould that the rubber will adhere very strongly to the member 18, and will allow the formation of a roller having the square in section outer grooves and will allow relatively easy separation of the mould sections 23 and 24.

It will now be noted that I have provided the various advantages mentioned in the objects of my invention with other advantages being apparent.

Some changes may be made in the construction and arrangement of the parts of my invention without departing from the real spirit and purpose of my invention, and it is my intention to cover by my claim any modified forms of structure or use of mechanical equivalents which may be reasonably included within its scope.

I claim as my invention:

A mould for forming rubber rollers comprising end plates, a centrally positioned core member normally secured to said end plates, a pair of opposed arcuate sections bolted to said end plates, means for injecting semi-cured rubber into the space between said core member and said sections for providing a homogeneous rubber roller adherent to said core member, said sections having arcuate end grooves, said end plates including peripheral flange portions received in said end grooves, one of said end plates having an opening for receiving said injected semi-cured rubber.

References Cited

UNITED STATES PATENTS

| | | | |
|---|---|---|---|
| 599,939 | 3/1898 | Kunzlev | 249—141 XR |
| 918,779 | 4/1909 | Searle | 249—142 XR |
| 1,200,245 | 10/1916 | Sevel | 249—142 XR |
| 3,078,205 | 2/1963 | Saver et al. | 18—6 |
| 3,109,202 | 11/1963 | Beckadolph et al. | 18—42 |

WILLIAM J. STEPHENSON, Primary Examiner.

J. HOWARD FLINT, JR., Examiner.